United States Patent
Jun et al.

(10) Patent No.: US 12,022,596 B2
(45) Date of Patent: Jun. 25, 2024

(54) INDUCTION HEATING-TYPE COOKTOP HAVING IMPROVED USABILITY

(71) Applicant: LG Electronics Inc., Seoul (KR)

(72) Inventors: Hyunwoo Jun, Seoul (KR); Wontae Kim, Seoul (KR); Seongho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 405 days.

(21) Appl. No.: 16/810,491

(22) Filed: Mar. 5, 2020

(65) Prior Publication Data

US 2020/0288542 A1  Sep. 10, 2020

(30) Foreign Application Priority Data

Mar. 5, 2019  (KR) .................. 10-2019-0025435

(51) Int. Cl.
*H05B 6/10* (2006.01)
*F24C 15/08* (2006.01)
(Continued)

(52) U.S. Cl.
CPC ............. *H05B 6/105* (2013.01); *F24C 15/08* (2013.01); *F24C 15/34* (2013.01); *H05B 6/062* (2013.01); *H05B 6/1263* (2013.01); *H05B 6/1281* (2013.01); *H05B 2206/022* (2013.01); *H05B 2213/05* (2013.01)

(58) Field of Classification Search
CPC .......... H05B 2206/022; H05B 2213/05; H05B 6/062; H05B 6/105; H05B 6/1209; H05B 6/1263; H05B 6/1281; F24C 15/08; F24C 15/34
See application file for complete search history.

(56) References Cited

U.S. PATENT DOCUMENTS 6,770,857 B2    8/2004 Hirota et al.
10,582,573 B2 *  3/2020 Hoare ................. F24C 15/105
(Continued)

FOREIGN PATENT DOCUMENTS

DE      10127051         12/2002
DE      10127051 A1 *    12/2002    ........... H05B 6/1209
(Continued)

OTHER PUBLICATIONS

"Machine Translation of DE 10127051, Goetz, Cooker hob has inductor supplied with HF alternating current, receiver for inductively generated heating energy in form of electrically conductive receptor forming heating surface, 2001" (Year: 2001).*

(Continued)

*Primary Examiner* — Janie M Loeppke
*Assistant Examiner* — Abigail H Rhue
(74) *Attorney, Agent, or Firm* — Fish & Richardson P.C.

(57) ABSTRACT

An induction heating-type cooktop include a case, a cover plate comprising an upper plate that is coupled to an upper end of the case and that is configured to seat an object to be heated on an upper surface of the upper plate, a working coil disposed in the case and configured to heat the object, a module base that is disposed at a lower surface of the upper plate and that includes a thin layer attached to a surface of the module base, and a thermal insulation material disposed between the module base and the working coil.

20 Claims, 8 Drawing Sheets

(51) Int. Cl.
*F24C 15/34* (2006.01)
*H05B 6/06* (2006.01)
*H05B 6/12* (2006.01)

(56) References Cited

U.S. PATENT DOCUMENTS

| | | | | |
|---|---|---|---|---|
| 2004/0245244 | A1* | 12/2004 | Hirota | H05B 6/1254 |
| | | | | 219/624 |
| 2008/0073337 | A1* | 3/2008 | Haag | H05B 6/1281 |
| | | | | 219/622 |
| 2012/0138596 | A1* | 6/2012 | Alonso Esteban | C03C 17/36 |
| | | | | 219/600 |
| 2016/0050721 | A1 | 2/2016 | Corda | |

FOREIGN PATENT DOCUMENTS

| | | |
|---|---|---|
| EP | 1906709 | 4/2008 |
| JP | H11-151172 | 6/1999 |
| JP | 2008311058 | 12/2008 |
| JP | 5630495 | 11/2014 |
| KR | 10-2004-0089074 | 10/2004 |
| WO | WO 2002100130 | 12/2002 |

OTHER PUBLICATIONS

Extended European Search Report in European Appln. No. 20161110.0, dated Jul. 22, 2020, 10 pages.
Office Action in Korean Appln. No. 10-2019-0025435, mailed on Nov. 20, 2023, 10 pages (with English translation).

* cited by examiner

INDUCTION HEATING-TYPE COOKTOP HAVING IMPROVED USABILITY

CROSS-REFERENCE TO RELATED APPLICATION

This application claims priority to and the benefit of Korean Patent Application No. 10-2019-0025435, filed on Mar. 5, 2019, the disclosure of which is incorporated herein by reference in its entirety.

TECHNICAL FIELD

The present disclosure relates to an induction heating-type cooktop having improved usability.

BACKGROUND

Various types of cooking apparatuses are used to heat food at homes and restaurants. For example, gas stoves may use gas as fuel. In some cases, cooking apparatuses may use electricity for heating an object subject such as a cooking container including a pot.

Methods for heating an object using electricity may be classified as a resistance heating method and an induction heating method. In the resistance heating method, an object may be heated by heat that is generated when electric current flows through a metallic resistance wire or a non-metallic heating element such as silicon carbide, and the heat is delivered to the object (e.g., a cooking container) through radiation or conduction. In the induction heating method, an object itself may be heated by eddy currents that are generated in the object made of metallic ingredients based on a magnetic field generated around a coil when a predetermined magnitude of high-frequency power is supplied to the coil.

The induction heating method may be applied to cooktops.

In some cases, where a cooktop uses the induction heating method, only magnetic objects may be heated. That is, when a non-magnetic object (e.g., thermal resistant glass, earthenware, and the like) is placed on the cooktop, the cooktop may not heat the object.

In some cases, a cooktop may include a heating plate to heat a non-magnetic object.

In some cases, efficient heating may not be ensured, and a time for boiling water may be longer than usual. For instance, where the heating plate has a communication hole, a cooking container made of metal may be heated in an electro inductive manner using magnetic lines of force that passes through the communication hole while the heating plate is heated using a heating coil.

In some cases, a hybrid cooktop may heat a non-magnetic object through a radiant heater using an electric resistance method, and a magnetic object through a working coil by an induction heating method.

In some cases, a high output from the radiant heater and efficient heating may not be ensured. In some cases, when placing an object at a heating area, a user may need to consider a material of the object.

In some cases, a cooktop for metallic objects may heat various metallic objects (i.e., a non-magnetic metallic object and a magnetic object).

The cooktop for metallic object may not heat a non-magnetic non-metallic object. In some cases, when a non-magnetic metallic object is heated, the cooktop for metallic objects may be less efficient in heating and incur more material costs than a radiant heater.

SUMMARY

The present disclosure describes an induction heating-type cooktop that can heat an object regardless of the type of the object and that can ensure enhanced heating efficiency.

For example, the induction heating-type cooktop can heat both of a magnetic object and a non-magnetic object, where a user may not consider a material of an object to be heated.

The present disclosure describes an induction heating-type cooktop that can heat an object directly and indirectly using the same heat source.

The present disclosure describes an induction heating-type cooktop in which, when an object is a magnetic object, most of the eddy currents may be supplied to the magnetic object, and a working coil may directly heat the object. When an object is a non-magnetic object, the working coil can indirectly heat the object.

The present disclosure describes an induction heating-type cooktop in which coating equipment can be scaled down and manufacturing costs can be reduced.

Aspects of the present disclosure are not limited to the above-described ones. Additionally, other aspects and advantages that have not been mentioned may be clearly understood from the following description and may be more clearly understood from implementations. Further, it will be understood that the aspects and advantages of the present disclosure may be realized via means and combinations thereof that are described in the appended claims.

According to one aspect of the subject matter described in this application, an induction heating-type cooktop include a case, a cover plate including an upper plate that is coupled to an upper end of the case and that is configured to seat an object to be heated on an upper surface of the upper plate, a working coil disposed in the case and configured to heat the object, a module base that is disposed at a lower surface of the upper plate and that includes a thin layer attached to a surface of the module base, and a thermal insulation material disposed between the module base and the working coil.

Implementations according to this aspect may include one or more of the following features. For example, the thin layer may be coated on an upper surface of the module base or a lower surface of the module base. In some examples, the thin layer may be made of a conductive material and has a magnetic property. In the same or other examples, the thin layer may be made of a conductive material and has a non-magnetic property.

In some implementations, a skin depth of the thin layer may be greater than a thickness of the thin layer. In some examples, the thickness of the thin layer is between 0.1 μm and 1,000 μm, and the thin layer may be configured to, based on a resistance value of the thin layer, be heated by the working coil.

In some implementations, the module base may be made of a material different from a material of the thin layer. In some examples, the module base may be configured to, based a resistance value of the module base, not be heated by the working coil. In some examples, the module base has a diameter less than a width of the upper plate.

In some implementations, the working coil may be configured to, based on a magnetic object being placed on the upper surface of the upper plate, be driven to heat the magnetic object, and the thin layer and the magnetic object may be configured to define an equivalent circuit based on the magnetic object being placed on the upper surface of the upper plate. For example, the equivalent circuit may include a first current path including a resistance component of the magnetic object and an inductance component of the magnetic object, and a second current path including a resistance component of the thin layer and an inductance component of the thin layer, where the second current path is electrically connected in parallel to the first current path.

In some examples, an electrical impedance defined by the resistance component and the inductance component of the magnetic object in the equivalent circuit is less than an electrical impedance defined by the resistance component and the inductance component of the thin layer in the equivalent circuit.

In some implementations, the working coil may be configured to, based on a magnetic object being placed on the upper surface of the upper plate, be driven to generate an eddy current in at least one of the magnetic object or the thin layer to thereby heat the magnetic object, and a magnitude of the eddy current in the magnetic object is greater than a magnitude of the eddy current in the thin layer.

In some implementations, the working coil may be configured to, based on a non-magnetic object being placed on the upper surface of the upper plate, be driven to heat the non-magnetic object through the thin layer, and the thin layer and the non-magnetic object may be configured to, based on the non-magnetic object being placed on the upper surface of the upper plate, define an equivalent circuit including a resistance component of the thin layer and an inductance component of the thin layer. In some cases, the equivalent circuit may not include the resistance component of the thin layer and the inductance component of the non-magnetic object.

In some implementations, the working coil may be configured to, based on a non-magnetic object being placed on the upper surface of the upper plate, be driven to heat the non-magnetic object through an eddy current carried by the thin layer, and the eddy current is not applied to the non-magnetic object.

In some implementations, the working coil may be configured to, based on a magnetic object being placed on the upper surface of the upper plate, directly heat the magnetic object by induction and, based on a non-magnetic object being placed on the upper surface of the upper plate, heat the thin layer by induction to thereby heat the non-magnetic object. In some examples, the module base may be configured to receive a part of heat generated in the thin layer.

In some implementations, the induction heating-type cooktop may further include a shield plate that is disposed on a lower surface of the working coil and that is configured to block a magnetic field generated vertically below the working coil based on the working coil being driven, a supporter that is disposed between a lower surface of the shield plate and a lower surface of the case and that supports the shield plate upward, and a cooling fan disposed in the case and configured to cool the working coil.

In some examples, the supporter may include an elastic object that supports the shield plate upward. In some examples, the cooling fan may be configured to, draw external air from an outside of the case and blow the drawn external air to the working coil, or draw internal air from an inside the case and discharge the drawn internal air to the outside of the case. The thermal insulation material may be configured to block heat transfer from the object or the thin layer to the working coil. In some implementations, the working coil may be disposed between the thermal insulation material and the shield plate.

In some implementations, an induction heating-type cooktop may include a working for heating a magnetic object and a thin layer for heating a non-magnetic object, thereby making it possible to heat both of the magnetic object and non-magnetic object.

In some implementations, the induction heating-type cooktop may include the working coil and the thin layer provided to overlap with each other vertically, where the thin layer may be coated on an upper surface or a lower surface of a module base, may be made of a conductive material, may have at least one of a magnetic property and a non-magnetic property, and may be inductively heated by eddy currents induced by the working coil.

In some implementations, when the induction heating-type cooktop heats a magnetic object, a magnetic field generated by the working coil may pass through the thin layer and may be delivered to the object because skin depth of the thin layer is greater than thickness of the thin layer, thereby allowing eddy current to be induced to the object.

In some implementations, when the induction heating-type cooktop heats a non-magnetic object, eddy currents may be induced to the thin layer by a magnetic field generated by the working coil.

In some implementations, the induction heating-type cooktop may include a module base in which the thin layer is coated on one surface of the module base. The module base has a smaller size than an upper plate, and the module base and the upper plate are individually manufactured, thereby ensuring a size of coating equipment of the induction heating-type cooktop and costs incurred to manufacture the induction heating-type cooktop that are less than those of a cooktop in which a thin layer is directly coated on an upper plate.

In some implementations, the induction heating-type top allows a user to place an object to be heated on any heating area on an upper plate without causing the user to find out whether the object is a magnetic object or a non-magnetic object, which may improve usability of the cooktop.

In some implementations, the induction heating-type cooktop may heat an object using the same heat source directly and indirectly without an additional heating plate or an additional radiant heater, thereby ensuring more efficient heating and reducing material costs.

In some implementations, a reduced size of coating equipment and cost reduction to manufacture the induction heating-type cooktop may improve productivity of the induction heating-type cooktop in mass production.

Detailed effects of the present disclosure are described together with the above-described effects in the detailed description of the disclosure.

DETAILED DESCRIPTION

Figure 1:
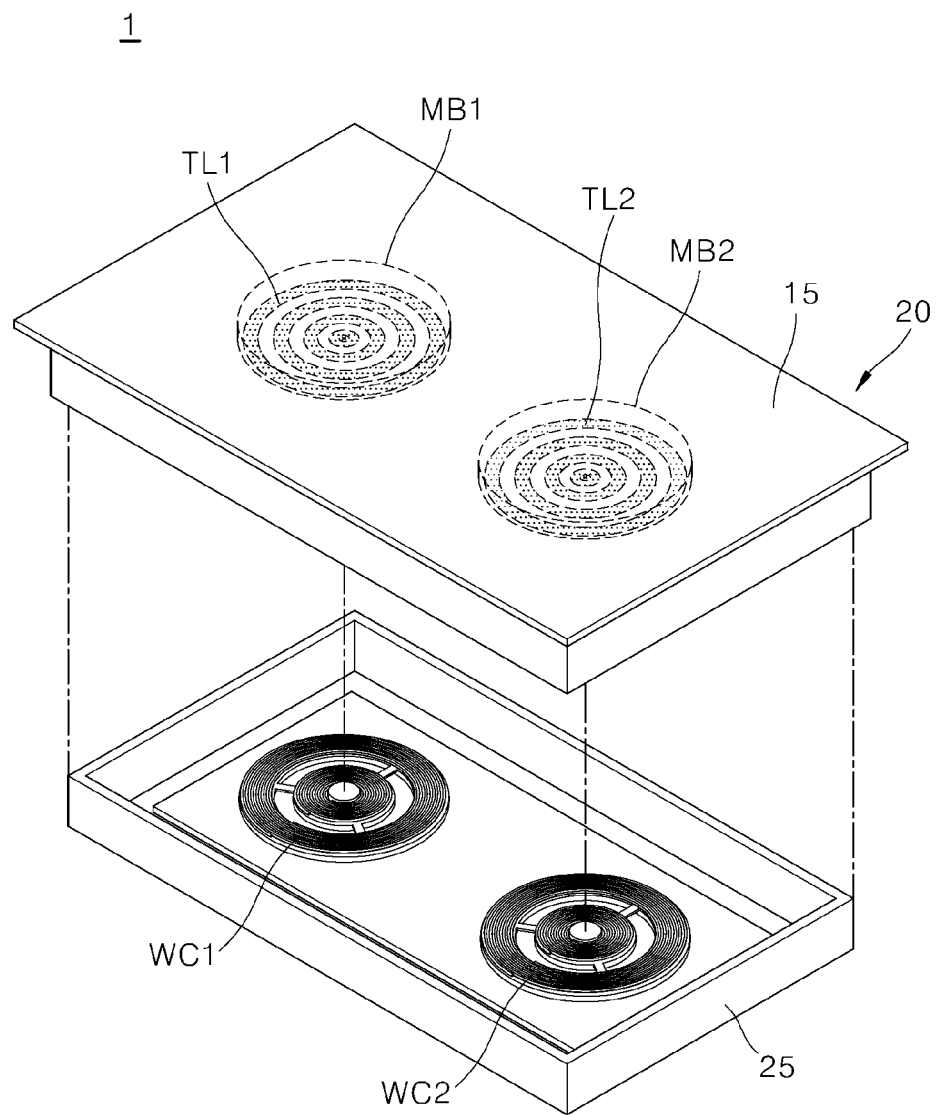
FIG. 1 is a view illustrating an example of an induction heating-type cooktop.

The above-described aspects, features and advantages are specifically described with reference to the attached drawings hereunder such that one having ordinary skill in the art to which the present disclosure pertains may easily implement the technical spirit of the disclosure. In describing the disclosure, detailed description of known technologies in relation to the disclosure is omitted if it is deemed to make the gist of the present disclosure unnecessarily vague. Below, one or more implementations of the present disclosure are specifically described with reference to the accompanying drawings. Throughout the drawings, identical reference numerals denote identical or similar components.

Figure 2:
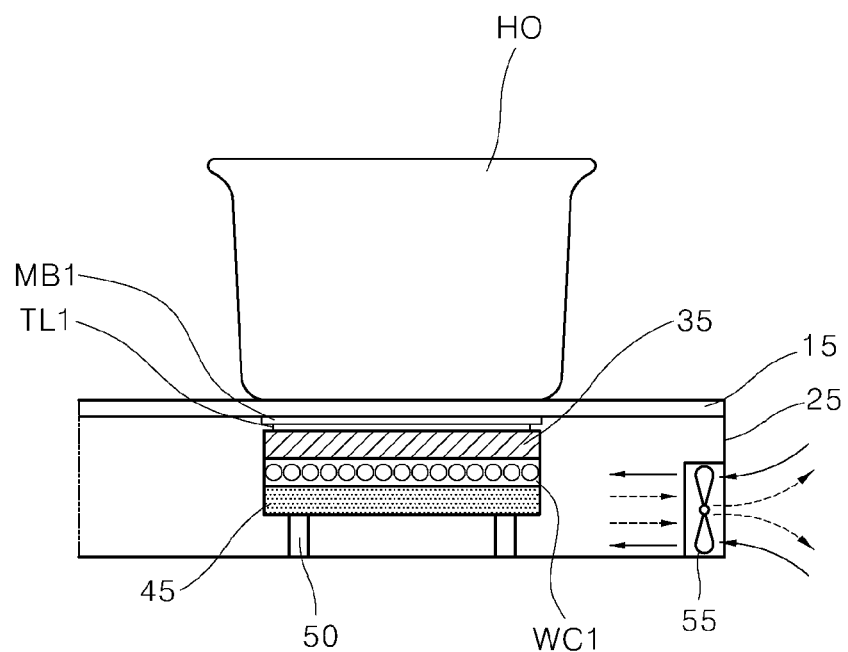
FIG. 2 is a view illustrating example components in an example case of the induction heating-type cooktop in FIG. 1.
Figure 3:
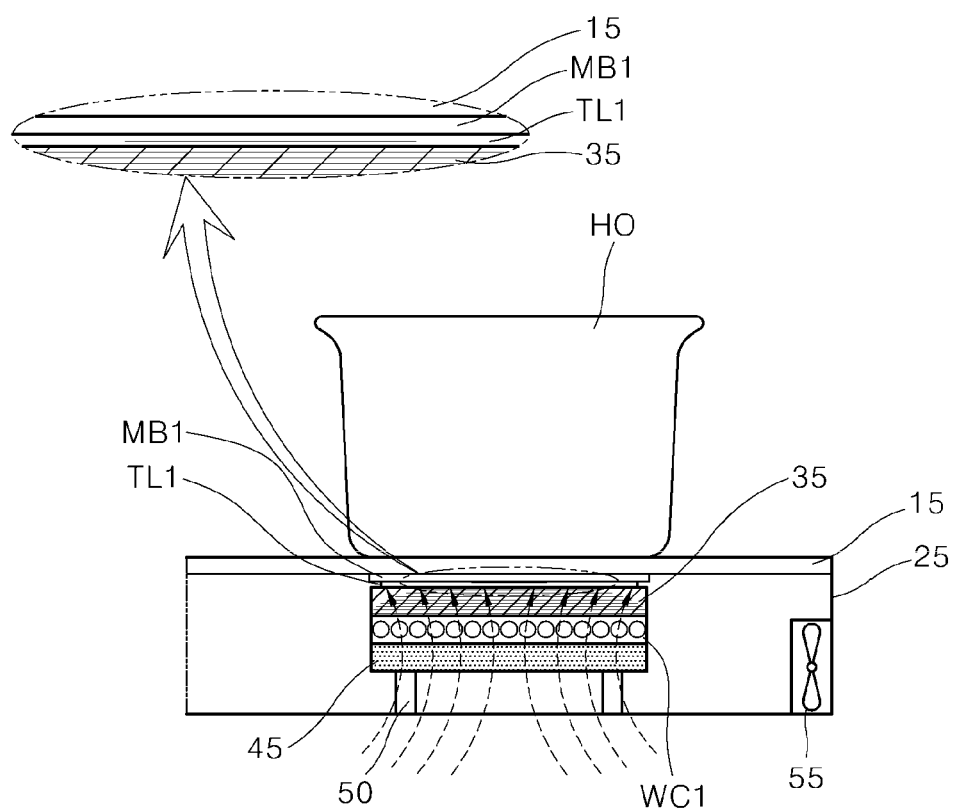
FIGS. 3 and 4 are views illustrating an example of a relation between a thickness and a skin depth of a thin layer.
Figure 4:
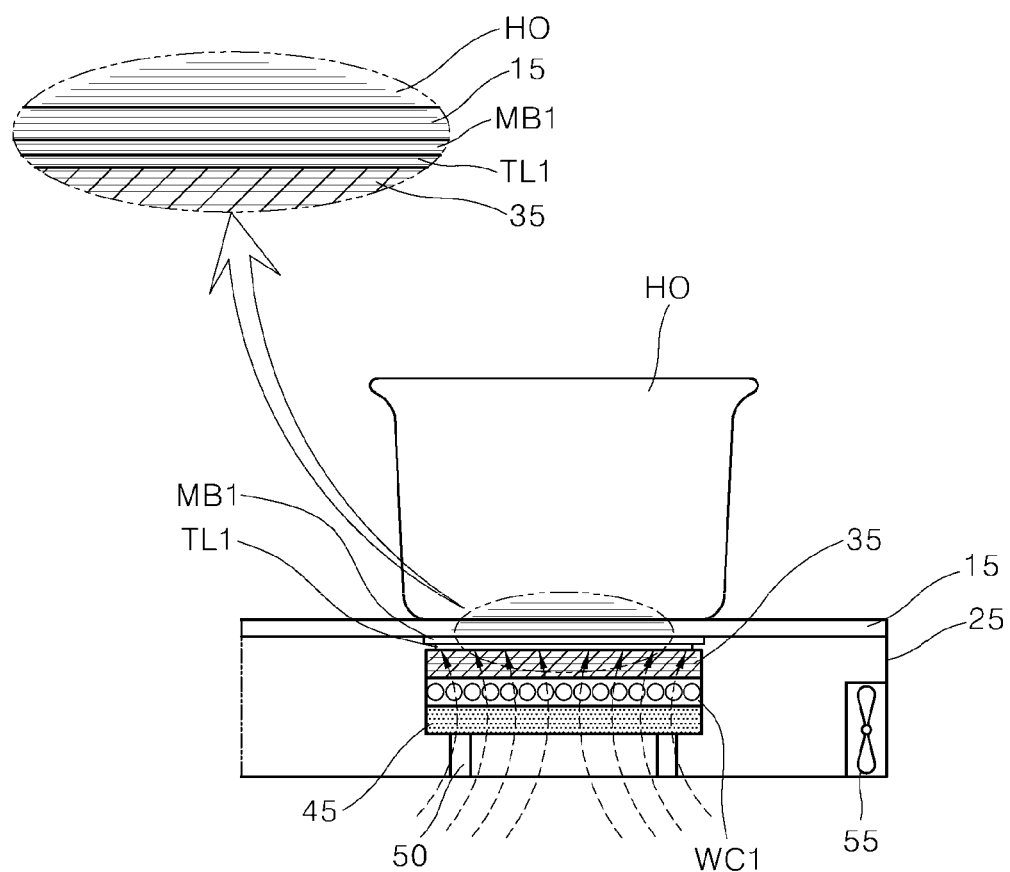
Figure 5:
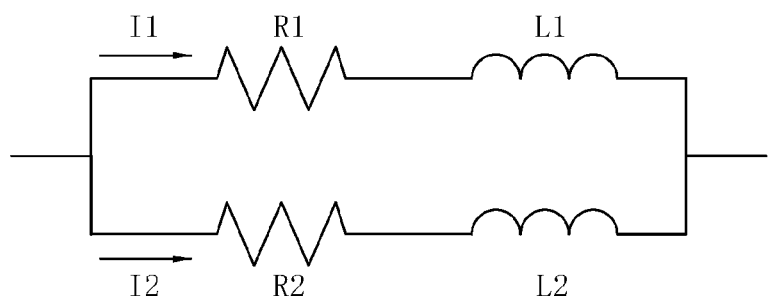
FIGS. 5 and 6 are views illustrating examples of equivalent circuits and an electrical impedance change between a thin layer and an object based on types of objects to be heated.
Figure 6:

FIG. 1 illustrates an example induction heating-type cooktop. FIG. 2 illustrates example components disposed in an example case of the induction heating-type cooktop in FIG. 1. FIGS. 3 and 4 illustrates features of a skin depth of a thin layer based on a relative permeability of the thin layer. FIGS. 5 and 6 illustrate example equivalent circuits and an example of an impedance change between a thin layer and an object based on types of the objects.

Referring to FIG. 1, the induction heating-type cooktop 1 may include a case 25, a cover plate 20, working coils including a first working coil (WC1) and a second working coil (WC2), module bases including a first module based (MB1) and a second module base (MB2), thin layers including a first thin layer (TL1) and a second thin layer (TL2).

The working coils WC1 and WC2 may be installed in the case 25.

In some implementations, the case 25 may include various devices in relation to driving of the working coil (e.g., a power supplier that supplies alternating current (AC) power, a rectifier that rectifies AC power of the power supplier into direct current (DC) power, an inverter that converts DC power rectified by the rectifier into resonance currents through switching operations and that supplies the resonance currents to the working coil, a control module (including a control module for an inverter, which controls switching operations of the inverter, and a control module for an input interface, which controls an input interface) that controls operations of various devices in the induction heating-type cooktop 1, and a relay or a semiconductor switch that turns on or off the working coil), in addition to the working coils WC1 and WC2. However, detailed description in relation to this is omitted.

The cover plate 20 may include an upper plate 15 which is coupled to an upper end of the case 25, and where an object is placed on an upper surface of the upper plate.

Specifically, the cover plate 20 may include an upper plate 15 on which an object such as a cooking container is placed.

The upper plate 15, for example, may be made of a glass material (e.g., ceramics glass).

In some implementations, the upper plate 15 may include an input interface that receives an input from a user and that delivers the input to the above-described control module. In some examples, the input interface may also be provided at another position not at the upper plate 15.

The input interface, which is a module for inputting heating intensity desired by a user or a driving period of the induction heating-type cooktop 1 and the like, may be implemented in various different forms such as a physical button or a touch panel and the like. The input interface, for example, may include a power button, a lock button, a power-level adjusting button (+, and −), a timer adjusting button (+, and −), a charge-mode button and the like. Additionally, the input interface may deliver an input received from the user to a control module for an input interface, and the control module for an input interface may deliver the input to a control module for an inverter. The control module for an inverter may control operations of various devices (e.g., the working coil) based on the input (the input from the user) received from the control module for an input interface. Detailed description in relation to this is omitted.

Whether the working coil (e.g., the first and second working coils WC1 and WC2 is driven, and heating intensity (i.e., thermal power) may be displayed visually on the upper plate 15 in a burner shape. The burner shape may be displayed by an indicator made of a plurality of light-emitting elements (e.g., light emitting diodes (LEDs)) provided in the case 25.

The first and second working coils WC1 and WC2 may be installed in the case 25 to heat an object.

Specifically, driving of the first and second working coils WC1 and WC2 may be controlled by the control module for an inverter, and, when an object is placed on the upper plate 15, the first and second working coils WC1 and WC2 may be driven by the control module for an inverter.

The first and second working coils WC1 and WC2 may directly heat a magnetic object, and may indirectly heat a non-magnetic object through the below-described first and second thin layers TL1 and TL2.

The first and second working coils WC1 and WC2 may heat an object through the method of induction heating, and may be placed to respectively overlap with the first and second module bases MB1 and MB2 coated respectively with the first and second thin layers TL1 and TL2 in a vertical direction (e.g., a perpendicular direction, or an up-down direction).

Although FIG. 1 illustrates two working coils WC1 and WC2 installed in the case 25, the present disclosure is not limited. That is, a single working coil, or three or more working coils may be installed in the case 25. In FIG. 1, for convenience of description, two working coils WC1 and WC2 installed in the case 25 is described as an example.

The module base may include first and second module bases MB1 and MB2. The first and second module bases MB1 and MB2 may be spaced apart from each other on a lower surface of the upper plate 15, respectively.

One surface (e.g., an upper surface or a lower surface) of the first module base MB1 is coated with the first thin layer TL1, and one surface (i.e., an upper surface or a lower surface) of the second module base MB2 may be coated with the second thin layer TL2.

The first and second module bases MB1 and MB2 may be provided to overlap respectively with the first and second working coils WC1 and WC2 in the vertical direction (the perpendicular direction, or the up-down direction).

The first and second thin layers TL1 and TL2 may also be provided to overlap respectively with the first and second working coils WC1 and WC2 in the vertical direction (the perpendicular direction, or the up-down direction). Accordingly, regardless of the position of and the type of an object, the object may be heated.

The first and second thin layers TL1 and TL2 may respectively coat the first and second module bases MB1 and MB2 to heat a non-magnetic object among objects.

The first and second thin layers TL1 and TL2 may have at least one of a magnetic property and a non-magnetic property (i.e., a magnetic property, a non-magnetic property or both of them).

The first and second thin layers TL1 and TL2, for example, may be made of an conductive material (e.g., aluminum), and, as illustrated in the drawings, may respectively coat one surface of the first and second module bases MB1 and MB2 in a form in which a plurality of rings having different diameters are repeated. However, the present disclosure is not limited.

That is, the first and second thin layers TL1 and TL2 may be made of another material instead of a conductive material and may respectively coat the first and second module bases MB1 and MB2 in different forms. For convenience of description, in some examples, the first and second thin layers TL1 and TL2, made of a conductive material and respectively coating one surface of the first and second module bases MB1 and MB2 in the form that a plurality of rings having different diameters are repeated, are described as an example.

The first and second module bases MB1 and MB2 may be made of a material different from a material of the first and second thin layers TL1 and TL2.

The first and second module bases MB1 and MB2 may be made of a material that may not be inductively heated by the working coil, and may have thermal resistance and thermal conductivity of a specific level or higher.

For example, the first and second module bases MB1 and MB2 may be made of any one of an organic material, an inorganic material, and a metallic material.

In some implementations, inorganic materials used for the first and second module bases MB1 and MB2 include ceramics, glass and the like, organic materials used for the first and second module bases MB1 and MB2 include high-temperature heat resistant plastics and the like, and metallic materials used for the first and second module bases MB1 and MB2 include a metallic material thick enough (e.g., 1 mm thick aluminum) so that the metallic material is not inductively heated by the working coil.

Unlike the first and second module bases MB1 and MB2, the first and second thin layers TL1 and TL2 may be made of a material that can be inductively heated by the working coil, and may have a thickness to the extent that the first and second thin layers TL1 and TL2 are inductively heated by the working coil. Detailed description in relation to this is provided below.

A diameter (i.e., a size) of each of the first and second module bases MB1 and MB2 may be smaller than a diameter of the upper plate 15.

In the case of a cooktop in which the first and second thin layers TL1 and TL2 coat the upper plate 15, when the cooktop is actually manufactured, the upper plate 15 of the cooktop 1 may be offered during the process of coating. Accordingly, although a cook zone of a diameter of 8 inches (an exemplary diameter), in which an object (i.e., a container) is placed, is actually coated, an approximately 24-inch-size upper plate 15 (e.g., (W; width) 575×(D; thickness) 515×(H; height) 4 mm) is offered during the process of coating. Accordingly, coating equipment may be scaled up, and a plurality of cooktops may not be manufactured at a time, thereby pushing up manufacturing costs.

In some implementations, the module base (MB1, MB2) having a size corresponding to a size of a cookzone (e.g., the module bases MB1 and MB2 having a diameter the same as or similar to an 8-inch diameter of a cookzone) may be coated with a thin layer. Accordingly, coating equipment may be scaled down and manufacturing costs may be reduced. With a reduction in manufacturing costs, productivity may be enhanced and mass production may be ensured.

In some examples, each of the first and second module bases MB1 and MB2, for example, may have resistance against temperatures of 600° C. or higher and thermal conductivity of 1.0 W/mk or more, and may diffuse part of heat generated in the first and second thin layers TL1 and TL2 (i.e., may serve as a heat diffusion layer). Description in relation to this is provided hereunder.

FIG. 1 illustrates two module bases MB1 and MB2 and two thin layers TL1 and TL2. However, the present disclosure is not limited. That is, a single module base and thin layer, or three or more module bases and thin layers may be provided. For convenience of description, in some implementations, two module bases MB1 and MB2 and two thin layers TL1 and TL2 are described as an example.

Referring to FIG. 2, the induction heating-type cooktop 1 may further include a thermal insulation material 35, a shield plate 45, a supporter 50, and a cooling fan 55.

Components placed near the first working coil WC1 are the same as components placed near the second working coil (WC2 in FIG. 1). Below, for convenience of description, components (a first module base MB1, a first thin layer TL1, a thermal insulation material 35, a shield plate 45, a supporter 50, and a cooling fan 55) around the first working coil WC1 are described.

The thermal insulation material 35 may be provided between the first module base MB1 and the first working coil WC1.

The thermal insulation material 35 may prevent or block heat generated while the first thin layer TL1 or an object to be heated (a heating object or "HO") is heated through driving of the first working coil WC1, from being delivered to the first working coil WC1.

That is, when the first thin layer TL1 or an object HO is heated by electromagnetic induction of the first working coil WC1, heat of the first thin layer TL1 or the object HO is delivered to the upper plate 15, and heat of the upper plate 15 is delivered to the first working coil WC1 again. Then the first working coil WC1 may be damaged.

The thermal insulation material 35, as described above, may cut off heat delivered to the first working coil WC1, thereby preventing damage caused by heat to the first working coil WC1 and preventing deterioration of heating performance of the first working coil WC1.

In some implementations, a spacer may be installed between the first working coil WC1 and the thermal insulation material 35.

The spacer may be inserted between the first working coil WC1 and the thermal insulation material 35 such that the first working coil WC1 does not directly contact the thermal insulation material 35. Accordingly, the spacer may prevent heat, which is generated while the first thin layer TL1 or an object HO is heated by driving of the first working coil WC1, from being delivered to the first working coil WC1 through the thermal insulation material 35.

That is, the spacer may partially serve as a thermal insulation material 35. Accordingly, a thickness of the thermal insulation material 35 may be minimized. By doing so, a gap between the object HO and the first working coil WC1 may be minimized.

Additionally, a plurality of spacers may be provided, and the plurality of spacers may be spaced apart from each other between the first working coil WC1 and the thermal insulation material 35. As a result, air, suctioned into the case 25 by the below-described cooling fan 55, may be guided to the first working coil WC1 by the spacer.

That is, the spacer guides the air introduced into the case 25 by the cooling fan 55 such that the air is delivered properly to the first working coil WC1. Accordingly, efficiency of cooling of the first working coil WC1 may be enhanced.

The shield plate 45 may be provided on a lower surface of the first working coil WC1 and may shield a magnetic field that is generated downwards when the first working coil WC1 is driven.

The shield plate 45 may shield a magnetic field that is generated downwards when the first working coil WC1 is driven, and may be supported upwards by a supporter 50.

The supporter 50 may be installed between a lower surface of the shield plate 45 and a lower surface of the case 25 and may support the shield plate 45 upwards.

The supporter 50 may indirectly support the first working coil WC1, the thermal insulation material 35, and the first module base MB1 upwards by supporting the shield plate 45 upwards. By doing so, the supporter 50 may keep the gap between the first working coil WC1 and the object HO constant.

The supporter 50, for example, may include an elastic object (e.g., a spring) for supporting the shield plate 45 upwards, and the elastic object is not limited. In some examples, the supporter 50 may also be omitted from the induction heating-type cooktop 1.

The cooling fan 55 may be installed in the case 25 to cool the first working coil WC1.

Operations of the cooling fan 55 may be controlled by the above-described control module and may be installed on a lateral wall of the case 25. The cooling fan 55 may also be installed at another position except a lateral wall of the case 25. In some implementations, for convenience of description, the cooling fan 55 installed on a lateral wall of the case 25 is described as an example.

Additionally, the cooling fan 55, as illustrated in FIG. 2, may suction air outside of the case 25 and may deliver the suctioned air to the first working coil WC1 or may suction air (particularly, hot air) inside the case 25 and may discharge the sectioned air out of the case 25.

Accordingly, components (particularly, the first working coil WC1 inside the case 25 may be efficiently cooled.

As described above, air outside of the case 25, delivered to the first working coil WC1 by the cooling fan 55, may be guided to the first working coil WC1 by the spacer. Accordingly, the first working coil WC1 may be cooled directly and efficiently, thereby ensuring improved durability (i.e., improved durability through the prevention of damage caused by heat) of the first working coil WC1.

The induction heating-type cooktop 1 may have the above-described features and configurations. Below, features and configurations of the above-described thin layer are described with reference to FIGS. 3 to 6.

For convenience of description, a thickness of each of the components in FIGS. 3 and 4 is schematically illustrated regardless of actual measurements, and a relative difference in thicknesses of the components is also are schematically illustrated regardless of actual measurements.

FIGS. 3 and 4 are views illustrating a relation between thickness and skin depth of the thin layer. FIGS. 5 and 6 are views illustrating an impedance change between the thin layer and an object based on the type of the object. In some examples, the skin depth may refer to a depth or a distance to which current penetrates from a surface made of a material, and the relative permeability of the material may be inversely proportional to the skin depth.

The first thin layer TL1 and the second thin layer TL2 may have the same technical features, and may be coated on an upper surface or a lower surface of each of the first module base MB1 and the second module base MB2. Below, for convenience of description, the first thin layer TL1 coating the lower surface of the first module base MB1 is described as an example.

Features of the first thin layer TL1 are described as follows.

The first thin layer TL1 may be made of a material having low relative permeability.

Specifically, as the first thin layer TL1 has a low relative permeability, the first thin layer TL1 may have a deep skin depth. The skin depth denotes a depth to which electric currents permeate a material from the surface of the material, and the relative permeability may be inversely proportional to the skin depth. Accordingly, as the first thin layer TL1 has a lower relative permeability, the first thin layer TL1 has a deeper skin depth. In some examples, the skin depth may be greater than 0.1 μm. In some examples, the skin depth may be greater than 1 mm. For example, a copper layer may have a skin depth of about 8.5 mm at 60 Hz.

The skin depth of the first thin layer TL1 may be greater than the thickness of the first thin layer TL1. That is, the first thin layer TL1 has a small thickness (e.g., 0.1 μm to 1,000 μm), and, as the skin depth of the first thin layer TL1 is greater than the thickness of the first thin layer TL1, a magnetic field, generated by the first working coil WC1, may pass through the first thin layer TL1 and be delivered to the object HO, and eddy currents may be induced to the object HO.

As illustrated in FIG. 3, when the skin depth of the first thin layer TL1 is smaller than the thickness of the first thin layer TL1, a magnetic field, generated by the first working coil WC1, is hardly delivered to the object HO.

When the skin depth of the first thin layer TL1 is greater than the thickness of the first thin layer TL1 as in some examples (as in FIG. 4), most of the magnetic field generated by the first working coil WC1 is delivered to the object HO. That is, in some implementations, as the skin depth of the first thin layer TL1 is greater than the thickness of the first thin layer TL1, a magnetic field generated by the first working coil WC1 may pass through the first thin layer TL1 and may be mostly used up at the object HO. By doing so, the object HO may be mostly heated.

Because the first thin layer TL1, as described above, has a small thickness, the first thin layer TL1 has a resistance value to the extent that the first thin layer TL1 can be heated by the first working coil WC1.

The thickness of the first thin layer TL1 may be inversely proportional to the resistance value (i.e., a surface resistance value) of the first thin layer TL1. As the first thin layer TL1 coating the first module base MB1 has a smaller thickness, the first thin layer TL1 has a greater resistance value (i.e., surface resistance). In some examples, when the first thin layer TL1 thinly is coated on the first module base MB1, properties of the first thin layer TL1 may be changed into properties of a heatable load.

The first thin layer TL1, for example, may have a thickness of 0.1 μm to 1,000 μm but is not limited.

The first module base MB1, as described above, has a thickness to the extent that the first module base MB1 is not inductively heated by a working coil. For instance, the first module base MB1 may have a thickness (e.g., 1 mm) greater than that of the first thin layer TL1, and may be a non-heatable load (i.e., a thickness and a resistance value to the extent to which the first module base MB1 may not be heated).

As the first thin layer TL1 with the features is to heat a non-magnetic object, impedance properties between the first thin layer TL1 and the object HO may be changed based on whether the object HO is a magnetic object or a non-magnetic object.

Referring to FIGS. 2 and 5, when a magnetic object HO is placed on an upper surface of the upper plate 15, and the first working coil WC1 is driven, a resistance (R1) and an inductance (L1) of the magnetic object HO, and a resistance (R2) and an inductance (L2) of the first thin layer TL1 may form an equivalent circuit. That is, the first thin layer TL1 and the magnetic object HO may be represented by the equivalent circuit in which the resistance (R1) and the inductance (L1) of the magnetic object are connected in parallel with the resistance (R2) and the inductance (L2) of the first thin layer.

In this case, impedance (i.e., impedance made of R1 and L1) of the object HO that has magnetic properties in the equivalent circuit may be lower than impedance (i.e., impedance made of R2 and L2) of the first thin layer TL1.

Accordingly, when the above-described equivalent circuit is formed, magnitude of eddy currents (I1) supplied to the magnetic object HO may be greater than magnitude of eddy currents (I2) supplied to the first thin layer TL1. Most of the eddy currents may be supplied to the object HO and the object HO may be heated.

That is, when the object HO is a magnetic object, the above-described equivalent circuit is formed, and most of the eddy currents are supplied to the object HO. Accordingly, the first working coil WC1 may directly heat the object HO.

In some examples, some of the eddy currents may also be supplied to the first thin layer TL1 and the first thin layer TL1 is slightly heated. Accordingly, the object HO may be slightly heated by the first thin layer TL1 indirectly. Comparing between the degree to which the object HO is directly heated by the first working coil WC1 and the degree to which the object HO is indirectly heated by the first thin layer TL1, the degree to which the object HO is indirectly heated by the first thin layer TL1 may be less than the degree to which the object HO is directly heated by the first working coil WC1.

In relation to an object that is a non-magnetic object, description is provided as follows.

Referring to FIGS. 2 and 6, a non-magnetic object HO is placed on the upper surface of the upper plate 15, and the first working coil WC1 is driven, the non-magnetic object HO may have no impedance, and the first thin layer TL1 may have impedance. For example, the first thin layer TL1 only may have a resistance (R) and an inductance (L). In some examples, the first thin layer TL1 and the non-magnetic object HO may be represented by the equivalent circuit including only the resistance (R2) and the inductance (L2) of the first thin layer.

Accordingly, eddy currents (I) may be supplied only to the first thin layer TL1, and eddy currents (I) may not be supplied to the non-magnetic object HO. Specifically, eddy currents (I) may be supplied only to the first thin layer TL1 and the first thin layer TL1 may be heated.

That is, when the object HO is a non-magnetic object, eddy currents (I) are supplied to the first thin layer TL1 and the first thin layer TL1 is heated, as described above. Thus, the non-magnetic object HO may be indirectly heated by the first thin layer TL1 heated by the first working coil WC1.

In this case, heat may be concentratedly generated in the first thin layer TL1, and the generated heat is concentratedly delivered to a partial area (i.e., an area adjacent to the first thin layer TL1 of the upper plate 15. Accordingly, a temperature of the upper plate 15 reaches a self-configured protection temperature rapidly, and a temperature sensor mounted onto the upper plate 15 senses that the temperature of the upper plate 15 has reached the protection temperature. The temperature sensor supplies sensed temperature information to the above-described control module, and the control module controls an output from the first working coil WC1 based on the supplied temperature information (i.e., when the temperature of the upper plate 15 reaches the protection temperature, the control module reduces an output from the first working coil WC1).

That is, when the temperature of the upper plate 15 reaches the protection temperature rapidly, output performance from the cooktop 1 is reduced while an output from the working coil is reduced suddenly.

In some implementations, the first thin layer TL1 may be coated on the first module base MB1, not on the upper plate 15, and the first module base MB1 has thermal resistance and thermal conductivity of a specific level or higher. Accordingly, part of the heat generated in the first thin layer TL1 may diffused through the first module base MB1.

That is, a rapid increase in temperatures of the upper plate 15 may be prevented, and a heat flow in the cooktop 1 may be efficiently dispersed, through the role of spreading or diffusing heat played by the first module base MB1. By doing so, improved output performance and improved security of the cooktop 1 may be ensured.

The protection temperature of the upper plate 15 may be set by a manufacturer of an upper plate or a manufacturer of a cooktop. That is, a manufacturer of an upper plate supplies information on lifespans based on temperatures to a manufacturer of a cooktop, and the manufacturer of a cooktop calculates a lifespan of a product considering time spent using a cooktop and may set a protection temperature of the upper plate 15.

The temperature sensor may be provided in one area of the upper plate 15, may sense changes in temperatures of the upper plate 15, and may supply sensed temperature information to the above-described control module.

In summary, regardless of whether an object HO is a magnetic object or a non-magnetic object, the object HO may be directly and indirectly heated by the first working coil WC1 that is a single heat source. That is, when the object HO is a magnetic object, the first working coil WC1 may directly heat the object HO, and, when the object HO is a non-magnetic object, the first thin layer TL1 heated by the first working coil WC1 may indirectly heat the object HO.

The induction heating-type cooktop 1, as described above, may heat both the magnetic object and non-magnetic object. Accordingly, the induction heating-type cooktop may heat an object regardless of the position and type of the object and may allow a user to place the object at any heating area on the upper plate without causing the user to find out whether the object is a magnetic object or a non-magnetic object, thereby ensuring improved usability.

The induction heating-type cooktop 1 may directly and indirectly heat an object using the same heat source without an additional heating plate or an additional radiant heater, thereby ensuring more efficient heating and reducing material costs.

A size of coating equipment of the induction heating-type cooktop 1 and costs incurred to manufacture the induction heating-type cooktop 1 may be smaller than those of a cooktop in which a thin layer is directly coated on an upper plate, thereby ensuring improved productivity and mass production.

Below, another exemplary induction heating-type cooktop is described.

Figure 7:
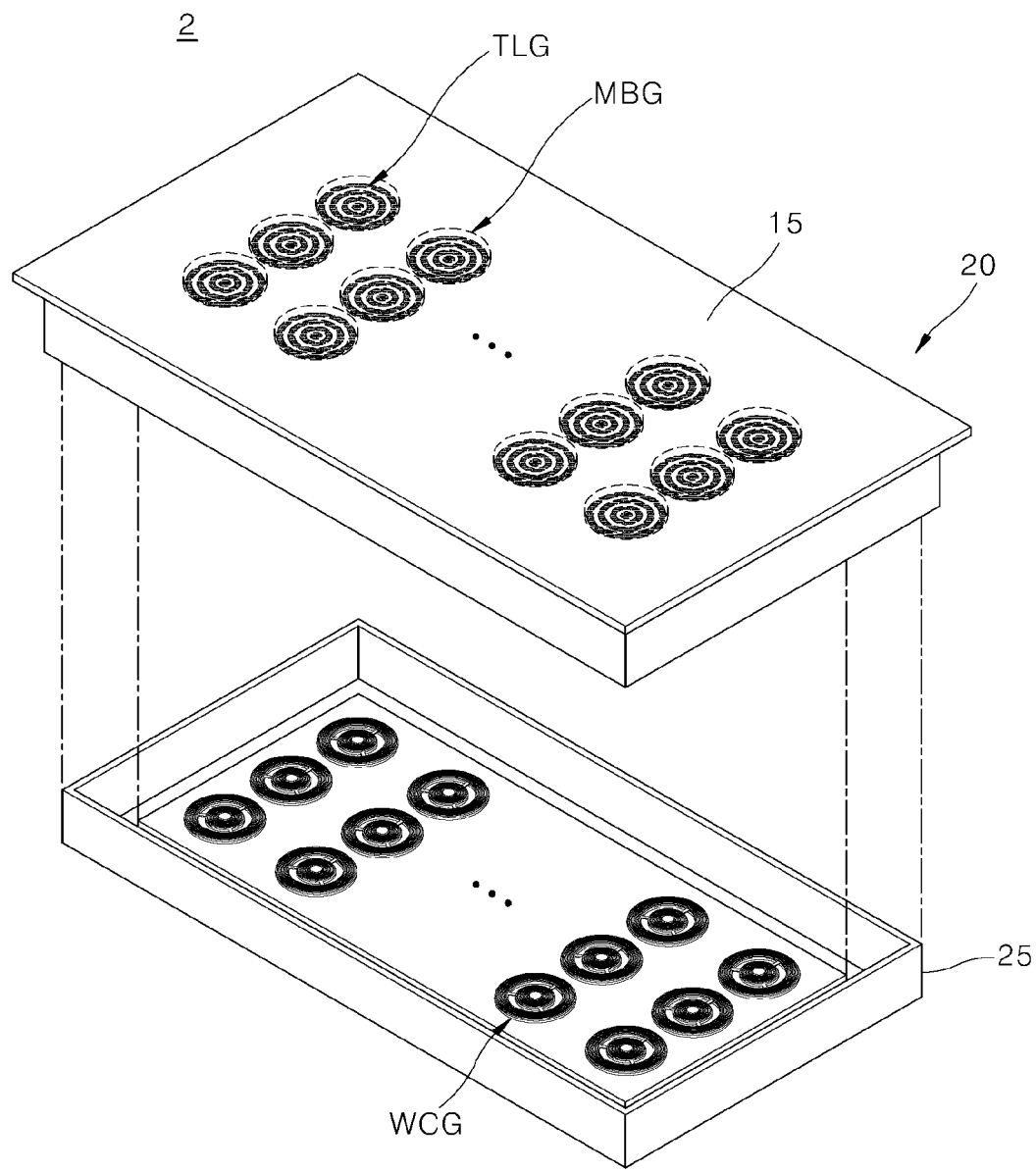
FIG. 7 is a view illustrating another example induction heating-type cooktop.
Figure 8:
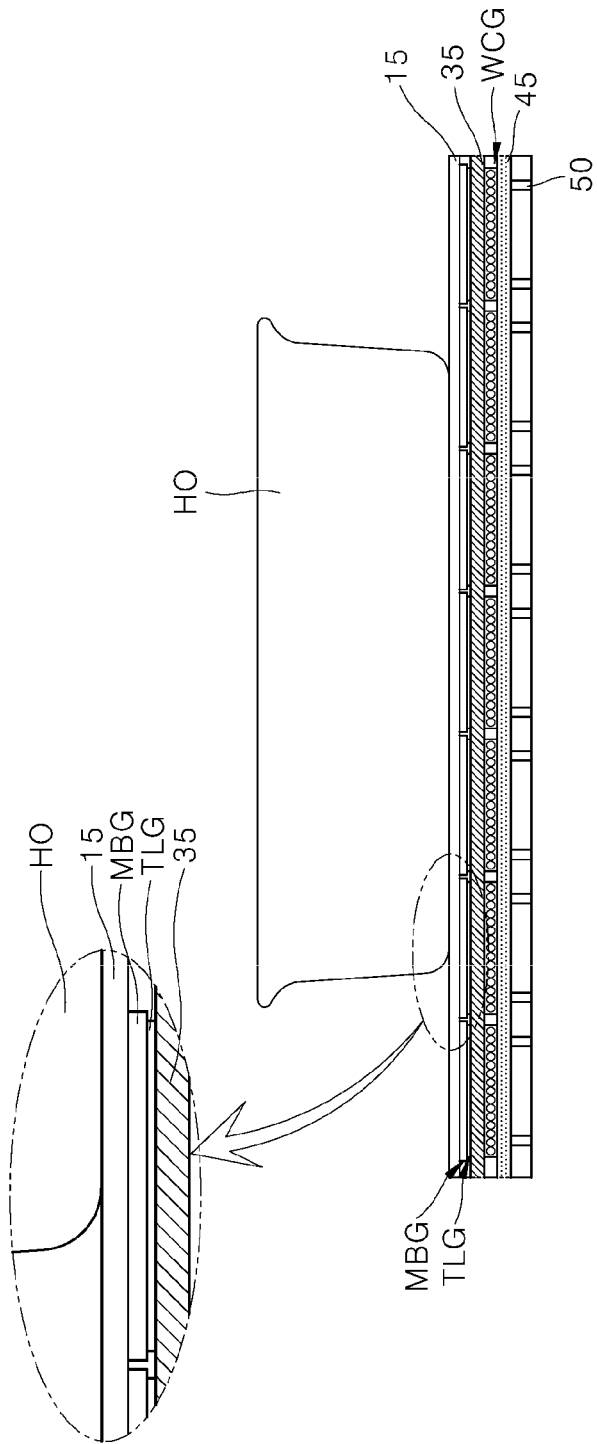
FIG. 8 is a view illustrating example components in an example case of the induction heating-type cooktop in FIG. 7.
Figure 9:
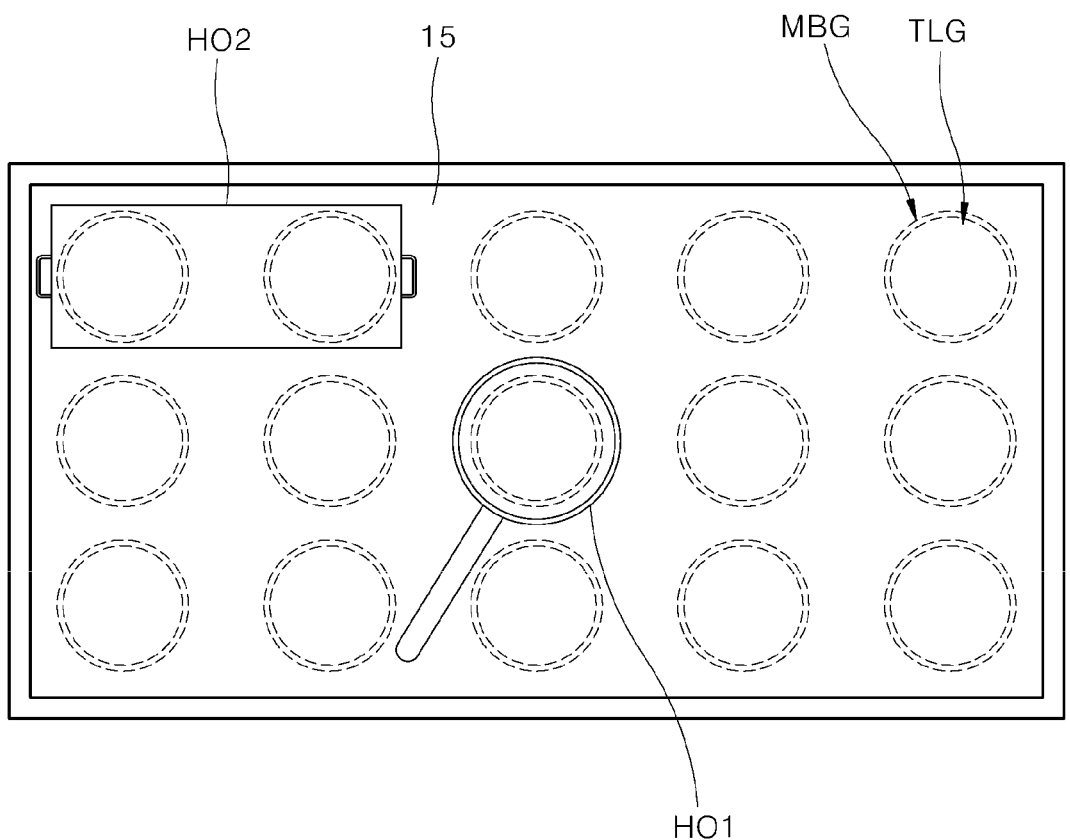
FIG. 9 is a view illustrating example objects to be heated on the induction heating-type cooktop in FIG. 7.

FIG. 7 is a view illustrating another exemplary induction heating-type cooktop. FIG. 8 is a view illustrating components provided in a case of the induction heating-type cooktop in FIG. 7. FIG. 9 is a view illustrating an object placed at the induction heating-type cooktop in FIG. 7.

The induction heating-type cooktop 2 is the same as the induction heating-type cooktop 1 in FIG. 1 except some components and effects. Accordingly, differences are described hereunder.

Referring to FIGS. 7 and 8, unlike the induction heating-type cooktop 1 in FIG. 1, the induction heating-type cooktop 2 may be a zone free cooktop.

The induction heating-type cooktop 2 may include a case 25, a cover plate 20, a plurality of module bases (MBG), a plurality of thin layers (TLG), a thermal insulation material 35, a plurality of working coils (WCG), a shield plate 45, a supporter 50, a cooling fan, a spacer and a control module.

In some implementations, the plurality of thin layers TLG may be coated on each of the plurality of module bases MBG. The plurality of thin layers TLG and the plurality of working coils WCG may overlap with each other vertically, and each of the plurality of thin layers TLG and each of the plurality of working coils WCG may be placed to correspond on a one-to-one basis.

In some examples, the plurality of thin layers TLG may include TL1 and TL2 described above with regard to FIG. 1. For example, the plurality of thin layers TLG may be a group of thin layers that are disposed side by side. In some examples, the plurality of module bases MBG may include MB1 and MB2 described above with regard to FIG. 1. For example, the plurality of module bases MBG may be a group of module bases that are disposed side-by-side corresponding to the group of thin layers.

In some implementations, the plurality of thin layers TLG and the plurality of working coils WCG may correspond on a many-to-many basis instead of a one-to-one basis. For convenience of description, in another implementation, the plurality of thin layers TLG and the plurality of working coils WCG, placed on a one-to-one basis, are described as an example.

That is, the induction heating-type cooktop 2, which is a zone free cooktop including a plurality of thin layers TLG and a plurality of working coils WCG, may heat a single object HO simultaneously with all or part of the plurality of working coils WCG or with all or part of the plurality of thin layers TLG. In some examples, the induction heating-type cooktop 2 may heat an object HO by using both all or part of the plurality of working coils WCG and all or part of the plurality of thin layers TLG.

In some implementations, the induction heating-type cooktop 2, as illustrated in FIG. 9, may heat objects to be heated (HO1 and HO2) regardless of the size, position and type of the objects (HO1 and HO2) in an area (e.g., an area of the upper plate 15) in which the plurality of working coils WCG (in FIG. 8) and the plurality of thin layers TLG are provided.

The present disclosure has been described with reference to the implementations illustrated in the drawings. However, the disclosure is not limited to the implementations and the drawings set forth herein. Further, various modifications may be made by one having ordinary skill in the art within the scope of the technical spirit of the disclosure. Furthermore, though not explicitly described during description of the implementations of the disclosure, effects and predictable effects according to the configuration of the disclosure should be included in the scope of the disclosure.

What is claimed is:

1. An induction heating-type cooktop, comprising:
   a case;
   a cover plate comprising an upper plate that is coupled to an upper end of the case and that is configured to seat an object to be heated on an upper surface of the upper plate;
   a working coil disposed in the case and configured to generate a magnetic field to thereby heat the object;
   a module base disposed at a lower surface of the upper plate, the module base comprising a thin layer coated on a lower surface of the module base facing the working coil; and
   a thermal insulation material disposed between the thin layer and the working coil,
   wherein a skin depth of the thin layer is greater than a thickness of the thin layer, and
   wherein the working coil is configured to:
      based on a magnetic object being placed on the upper surface of the upper plate, inductively heat the magnetic object by the magnetic field that passes through the thin layer and is transmitted to the magnetic object through the thin layer, and
      based on a non-magnetic object being placed on the upper surface of the upper plate, inductively heat the thin layer by the magnetic field that is delivered to the thin layer to thereby heat the non-magnetic object by the heated thin layer.

2. The induction heating-type cooktop of claim 1, wherein the thin layer is made of a conductive material and has a magnetic property.

3. The induction heating-type cooktop of claim 1, wherein the thin layer is made of a conductive material and has a non-magnetic property.

4. The induction heating-type cooktop of claim 1, wherein a thickness of the thin layer is between 0.1 μm and 1,000 μm, and
   wherein the thin layer is configured to, based on a resistance value of the thin layer, be heated by the working coil.

5. The induction heating-type cooktop of claim 1, wherein the module base is made of a material different from a material of the thin layer.

6. The induction heating-type cooktop of claim 5, wherein the module base is configured to, based a resistance value of the module base, not be heated by the working coil.

7. The induction heating-type cooktop of claim 1, wherein the module base has a diameter less than a width of the upper plate.

8. The induction heating-type cooktop of claim 1, wherein the working coil is configured to, based on the magnetic object being placed on the upper surface of the upper plate, be driven to heat the magnetic object, and
   wherein the thin layer and the magnetic object are configured to, based on the magnetic object being placed on the upper surface of the upper plate, define an equivalent circuit comprising:

a first current path comprising a resistance component of the magnetic object and an inductance component of the magnetic object; and a second current path comprising a resistance component of the thin layer and an inductance component of the thin layer, the second current path being electrically connected in parallel to the first current path.

9. The induction heating-type cooktop of claim 8, wherein an electrical impedance defined by the resistance component and the inductance component of the magnetic object in the equivalent circuit is less than an electrical impedance defined by the resistance component and the inductance component of the thin layer in the equivalent circuit.

10. The induction heating-type cooktop of claim 1, wherein the working coil is configured to, based on the magnetic object being placed on the upper surface of the upper plate, be driven to generate an eddy current in at least one of the magnetic object or the thin layer to thereby heat the magnetic object, and wherein a magnitude of the eddy current in the magnetic object is greater than a magnitude of the eddy current in the thin layer.

11. The induction heating-type cooktop of claim 10, wherein, based on the magnetic object being placed on the upper surface of the upper plate, the magnitude of the eddy current induced in the thin layer is greater than zero and less than the magnitude of the eddy current induced in the magnetic object.

12. The induction heating-type cooktop of claim 1, wherein the working coil is configured to, based on the non-magnetic object being placed on the upper surface of the upper plate, be driven to heat the non-magnetic object through the thin layer, and wherein the thin layer and the non-magnetic object are configured to, based on the non-magnetic object being placed on the upper surface of the upper plate, define an equivalent circuit comprising a resistance component of the thin layer and an inductance component of the thin layer.

13. The induction heating-type cooktop of claim 1, wherein the working coil is configured to, based on the non-magnetic object being placed on the upper surface of the upper plate, be driven to heat the non-magnetic object through an eddy current carried by the thin layer, and wherein the eddy current is not applied to the non-magnetic object.

14. The induction heating-type cooktop of claim 1, wherein the module base is configured to receive a part of heat generated in the thin layer.

15. The induction heating-type cooktop of claim 1, further comprising:

a shield plate that is disposed on a lower surface of the working coil and that is configured to block a magnetic field generated vertically below the working coil based on the working coil being driven;

a supporter that is disposed between a lower surface of the shield plate and a lower surface of the case and that supports the shield plate upward; and a cooling fan disposed in the case and configured to cool the working coil.

16. The induction heating-type cooktop of claim 15, wherein the supporter comprises an elastic object that supports the shield plate upward.

17. The induction heating-type cooktop of claim 15, wherein the cooling fan is configured to:

draw external air from an outside of the case and blow the drawn external air to the working coil; or draw internal air from an inside the case and discharge the drawn internal air to the outside of the case, and wherein the thermal insulation material is configured to block heat transfer from the object or the thin layer to the working coil.

18. The induction heating-type cooktop of claim 15, wherein the working coil is disposed between the thermal insulation material and the shield plate.

19. The induction heating-type cooktop of claim 1, wherein the working coil is configured to:

based on the magnetic object being placed on the upper surface of the upper plate, heat the magnetic object by an eddy current induced in the magnetic object by a magnetic field of the working coil passing through a surface of the thin layer, and based on the non-magnetic object being placed on the upper surface of the upper plate, heat the thin layer by an eddy current induced in the thin layer by the magnetic field to thereby heat the non-magnetic object by the heated thin layer.

20. The induction heating-type cooktop of claim 1, wherein the thickness of the thin layer and a material of the thin layer are determined to enable the working coil to:

based on the magnetic object being placed on the upper surface of the upper plate, directly heat the magnetic object by an eddy current induced in the magnetic object by a magnetic field of the working coil passing through a surface of the thin layer; and based on the non-magnetic object being placed on the upper surface of the upper plate, heat the thin layer by an eddy current induced in the thin layer by the magnetic field to thereby heat the non-magnetic object by the heated thin layer.

* * * * *